Sept. 15, 1959 — R. D. CAVANAUGH ET AL — 2,904,302
VIBRATION ISOLATING ASSEMBLY
Filed Oct. 5, 1956 — 3 Sheets-Sheet 1

INVENTORS
RICHARD D. CAVANAUGH
THOMAS P. GOETHEL
BY
Dike, Thompson & Sanborn
ATTORNEYS INVENTORS
RICHARD D. CAVANAUGH
THOMAS P. GOETHEL
BY
*Dike, Thompson & Sanborn*

ATTORNEYS

Sept. 15, 1959  R. D. CAVANAUGH ET AL  2,904,302
VIBRATION ISOLATING ASSEMBLY
Filed Oct. 5, 1956  3 Sheets-Sheet 3

INVENTORS
RICHARD D. CAVANAUGH
THOMAS P. GOETHEL
BY
Dike, Thompson & Sanborn
ATTORNEYS

United States Patent Office 2,904,302
Patented Sept. 15, 1959

2,904,302

VIBRATION ISOLATING ASSEMBLY

Richard D. Cavanaugh, Watertown, and Thomas P. Goethel, South Sudbury, Mass., assignors to Barry Controls Incorporated, Watertown, Mass., a corporation of Massachusetts Application October 5, 1956, Serial No. 614,113

6 Claims. (Cl. 248—358)

This invention relates to resilient supports and, more particularly, to vibration isolators. A vibration isolator is a device to reduce the magnitude of vibration as it is transmitted from one structure to another. The vibration whose magnitude is reduced may be either a vibratory motion or a vibratory force. Vibration isolators are commonly used to support engines, pumps, and other apparatus to prevent the transmission of force from such equipment to the structure which supports it. Vibration isolators are also used to mount delicate equipment in aircraft, vehicles, ships, industrial plants and the like to protect such equipment from the vibratory motion existing where the equipment is used.

It is often necessary to mount delicate direction-finding instruments such as gyro compasses, stable platforms, computing devices, etc. to afford protection against vibration. Such instruments are required by reason of their very function to maintain a fixed angular relation with respect to the carrying vehicle. This fixed angular relation must be maintained concurrently with the resilience required to afford vibration isolation. In other words, the instrument should be free to move against a relatively flexible spring in all translational directions of motion with respect to the carrying vehicle, but should be prevented from rotating about one or more coordinate axes with respect to such vehicle.

One object of this invention is to provide a vibration isolating assembly which has the required freedom of motion against a soft spring for translational displacement but which also has rigidity in rotation about one or more axes.

Another object of the invention is to provide the constraints necessary for achieving the function as outlined and adapted to be used with conventional self-contained vibration isolators. This makes possible a relatively economical design by employing standard isolator components supplemented by specially designed constraints to meet the needs for vibration isolation of direction finding instruments.

Another object of the invention is to provide a device in which vibration isolating elements and the constraining means may be constructed from materials which are substantially unaffected by extremes of temperature and other environmental conditions. Isolators are frequently used in military aircraft and in other locations wherein extreme temperatures exist, and it is desirable that the operation of the isolators be independent of environmental conditions insofar as possible.

Another object of this invention is to incorporate the vibration isolating element and the constraining means as components of a complete, self-contained assembly adapted for attachment to both the mounted equipment and the aircraft structure. Such a construction eliminates possible errors in alignment of component parts which may result during installation. It also makes possible the construction of a relatively rigid structure by the employment of integral stiffening means.

A further object of the invention is to arrange the isolator components as parts of an integrally formed base which is designed to conform to the particular requirements of the mounted equipment. This makes it possible to position the component parts of the base so as to conserve space without being restricted by the conventionality of individual isolators.

Other objects and advantages of the invention will be apparent to persons skilled in the art by referring to the following description and the accompanying drawings in which.

Figure 1:
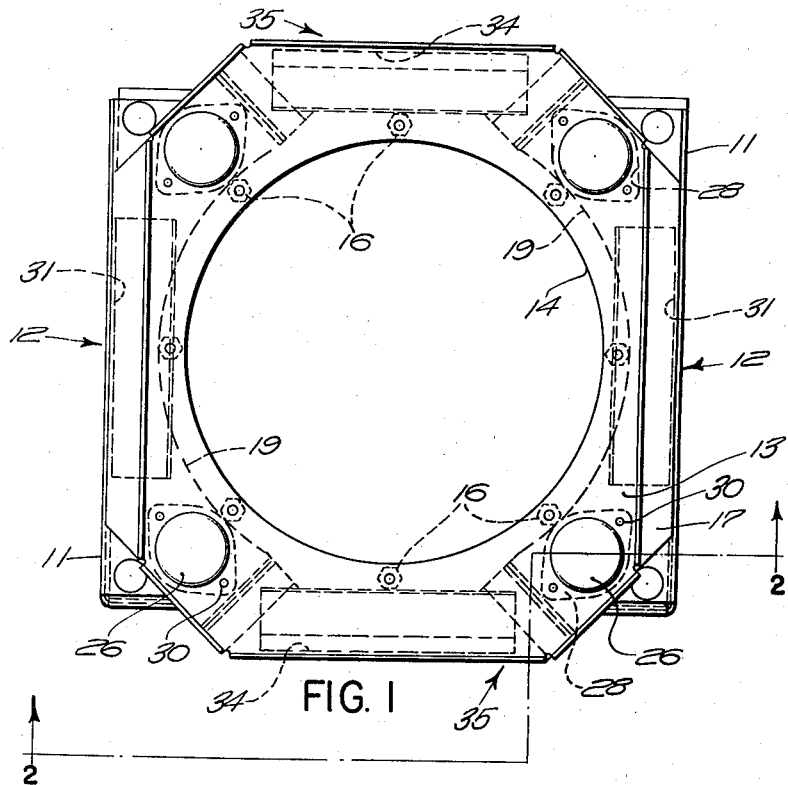
Fig. 1 is a plan view showing a preferred embodiment of this invention.
Figure 2:
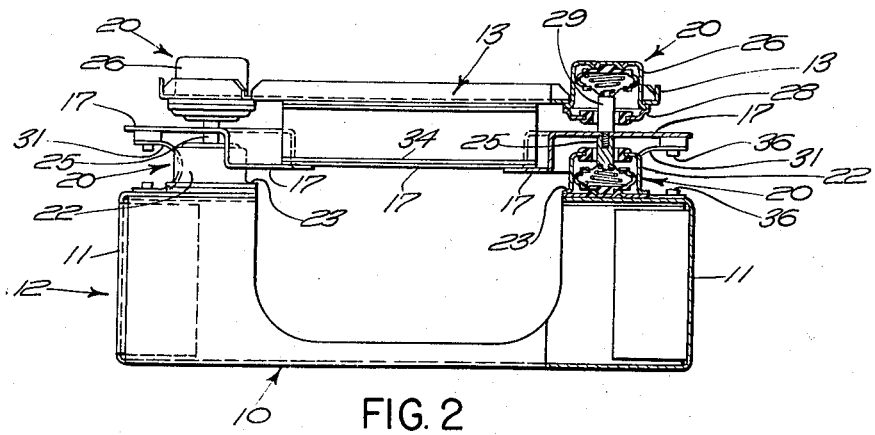
Fig. 2 is an elevation view of the embodiment illustrated in Fig. 1 with parts broken away and shown in section on the line 2—2 of Fig. 1.

In the embodiment shown in Figs. 1 and 2, the supporting member 10 (Fig. 2) appears substantially rectangular when viewed in the plan view (Fig. 1), and includes portions 11 of increased height arranged along each of the opposite sides 12. The supported member 13 has an outline generally similar to that of the supporting member 10, and is provided with a large aperture 14 in the center. The mounted or supported object (not shown) is attached to the supported member 13 by inserting bolts (not shown) through the nuts 16 (Fig. 1). The supported member 13 lies substantially in the same horizontal plane as the center-of-gravity of the supported object, and the lower part of the supported object lies between the upstanding portions 11 of the supporting member 10.

An intermediate structure 17 is interposed between the supporting member 10 and the supported member 13, in spaced relation thereto. The intermediate structure 17 includes a large aperture 19 in its center to provide clearance for the depending portion of the supported object.

The isolators 20 used with the embodiment shown in Figs. 1 and 2 are of a unitary type, for example, of the construction illustrated in United States Patents Nos. 2,610,016, dated September 9, 1952, or 2,744,718, dated May 8, 1956, although isolators of the type of the former patent are shown in Fig. 2. The lower isolators 22 are of a type having their mounting flanges 23 on their lower faces, the flanges 23 being attached to the upper faces of the upstanding portions 11 of the supporting member 10 by screws or bolts (not shown). The mounting studs 25 which project upwardly from within the housings of the isolators 22 are attached to the intermediate structure 17. The upper isolators 26 are of a type having their mounting flanges 28 adjacent the ends of the housings from which the mounting studs 29 protrude. The flanges 28 of the upper isolators are attached to the supported member 13 by screws or bolts 30 (Fig. 1) and the mounting studs 29 are attached to the intermediate structure 17 in alignment with the studs 25.

In a typical application of the vibration isolating assembly of this invention, the supporting member 10 is secured rigidly to the structure of an aircraft. When the aircraft rotates about a vertical axis, it is essential that the supported object rotate about a vertical axis to the same degree as the aircraft. In other words, there must be no flexibility in rotation about the vertical axis. Rigidity in this mode of motion is attained by specially designed constraining means which, in the embodiment of Figs. 1 and 2, are semicylindrical elements interposed between the supporting member 10 and the intermediate structure 17, and between the intermediate structure 17 and the supported member 13. A pair of these semi-cylindrical elements 31 is interposed between the raised portion 11 of the supporting member 10 and the intermediate structure 17, one along each of the two parallel sides 12. In the embodiment shown, the semi-cylindrical elements 31 extend a substantial part of the distance between adjacent isolators 20. A similar pair of semi-cylindrical elements 34 are interposed between the intermediate structure 17 and the supported member 13, one along each of the two parallel sides 35. These semi-cylindrical elements are preferably relatively thin so that they may be deflected easily, and are made from spring-like material such as steel so that they may experience substantial deflection without yielding.

Figure 3:
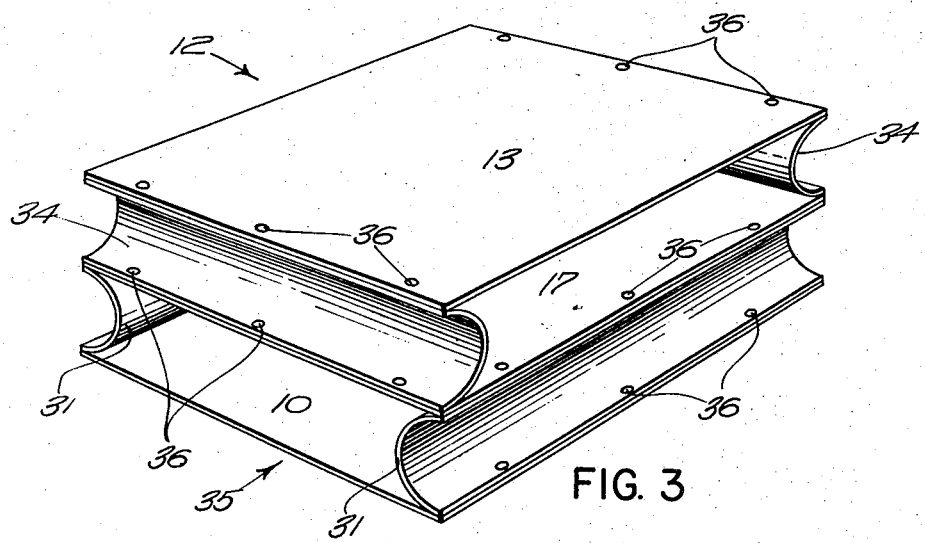
Fig. 3 is a perspective view of a schematic assembly of certain parts of one embodiment of this invention.

The construction and function of the constraining means may be explained more clearly by reference to Fig. 3 which is a perspective view of a schematic assembly including the supporting and supported members 10 and 13, intermediate structure 17, and semi-cylindrical elements 31, 34. As shown in this view the elements 13 and 34, 34 and 17, 17 and 31 and 31 and 10 are secured together by rivets 36. Considering rotation with respect to a vertical axis through the center of the assembly, the supported member 13 cannot rotate with respect to the structure 17 because such rotation tends to strain the upper semi-cylindrical elements 34 in shear and they are rigid with respect to such motion. Although rigid with respect to rotation about a vertical axis, the semi-cylindrical elements 34 are relatively flexible if the supported member 13 moves in vertical translation as they assume an elliptical shape with the major axis extending vertically. Similarly, these semi-cylindrical elements 34 are relatively non-rigid when the supported member 13 is moved horizontally relative to the intermediate structure 17 in a direction generally parallel with the edge 12 inasmuch as the elements 34 assume a skewed position.

The same type of analysis may be applied to the semi-cylindrical elements 31 which are interposed between the supporting member 10 and the intermediate structure 17. These elements 31 present great rigidity for rotational motion of the structure 17 with reference to the supporting member 10, while at the same time readily permitting with little opposition vertical translation of the intermediate structure 17 with reference to the supporting member 10. By analogy with the upper elements 34 discussed previously, the intermediate structure 17 is free to move relative to the supporting structure 10 in a direction parallel with the edge 35.

This arrangement of elements permits the supported member 13 to move vertically and in any horizontal direction with respect to the supporting member 10 but, prevents rotation about a vertical axis of the supported member 13 with reference to the supporting member 10. It should be noted that this rigidity is obtainable only if the semi-cylindrical members 31, 34 are relatively long.

Figure 4:
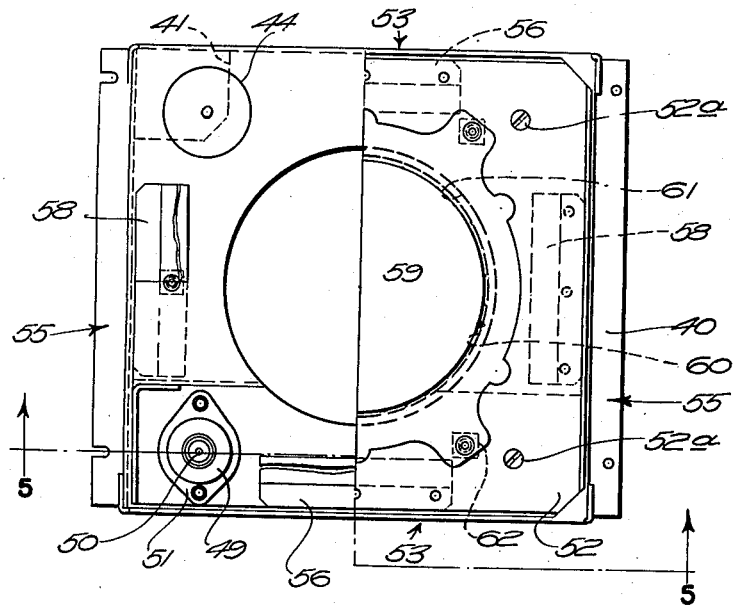
Fig. 4 is a view similar to Fig. 1 showing another embodiment of this invention with the seven o'clock quadrant broken away on the line A—A of Fig. 5 and the eleven o'clock quadrant broken away on the line B—B of Fig. 5.
Figure 5:
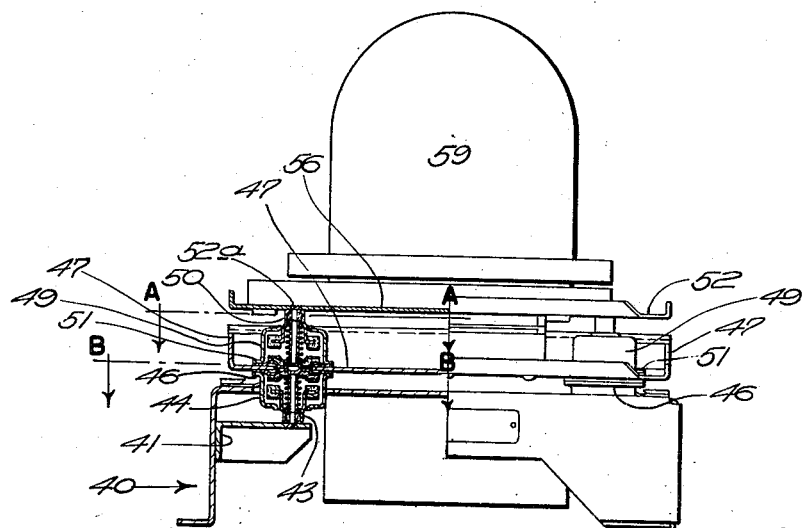
Fig. 5 is an elevation with parts broken away and shown in section on the line 5—5 of Fig. 4.

The embodiment illustrated in Figs. 4 and 5 is similar functionally to that illustrated in Figs. 1 and 2. In this embodiment, the supporting member 40 is equipped with inwardly projecting brackets 41 to which the downwardly projecting studs 43 of the lower isolators 44 are attached. The isolators 44 and 49 shown in section at the left of Fig. 5 are like the isolator shown in Fig. 7 of U.S. Patent 2,744,718 but they may be like the isolators shown in Fig. 2 or of any other well known unitary type. The lower isolators 44 include flanges 46 on their upper faces, these flanges being rigidly secured to the intermediate structure 47 by screws or bolts (not shown).

The upper isolators 49 are identical to the lower isolators 44 but are arranged in the inverse orientation with their flanges 51 attached to the intermediate structure 47 in alignment with the lower isolators 44. The central mounting studs 50 which project from the center of the upper isolators are attached rigidly to the supported member 52 by screws 52a (Fig. 4).

The two edges of the intermediate structure 47 adjacent to the edges 53 are depressed to accommodate the semi-cylindrical elements 56 which are interposed between the intermediate structure 47 and the supported member 52. In a somewhat similar manner, the portions of the intermediate structure 47 extending along the edges 55 are raised to accommodate the semi-cylindrical elements 58 which are interposed between the intermediate structure 47 and the supporting member 40. This arrangement of load supporting isolators and semi-cylindrical constraining elements is functionally similar to that shown in the embodiment of Figs. 1 and 2, and exhibits the same properties of rigidity in rotation about a vertical axis combined with freedom in translation along the vertical axis and along any horizontal axis.

In Figs. 4 and 5 the mounted unit 59 is shown and it extends downwardly within the central opening 60 in the supported member 52 and the central openings 61 in the intermediate structure 47 and the supporting member 40, being attached to the supported member 52 by three bolts (not shown) which engage nuts 62 (Fig. 4).

It should be noted, in the embodiments illustrated in the drawings, that the intermediate structure (17 in Figs. 1 and 2 and 47 in Figs. 4 and 5) is a common structure to which both the upper and lower isolators are attached. It thus provides a degree of stability by joining together the free-floating parts (the mounting studs 25, 29 in Figures 1 and 2, and the outer cups in Figures 4 and 5) of the isolators. The damping in the isolators tends to limit the vibration of the intermediate structure. The isolators are used in series to achieve a lower natural frequency than would be obtainable with a single isolator; a similar result is attainable by using specially designed isolators capable of sustaining the required deflection in a single isolator. In such circumstances, the isolator may extend directly between the supporting and supported members, free of any attachment to the intermediate structure. With this arrangement, the constraining properties of the assembly are not adversely affected, but the intermediate structure tends to vibrate during forced vibration of the assembly unless additional damping means is added to achieve this function. Such damping is provided in the embodiments shown as a normal characteristic of the standard isolators employed. The invention as set forth in the claims applies to either modification, in one case the intermediate structure being free of attachment to any isolator and in the other instance serving to connect and stabilize the respective isolators.

Figure 6:
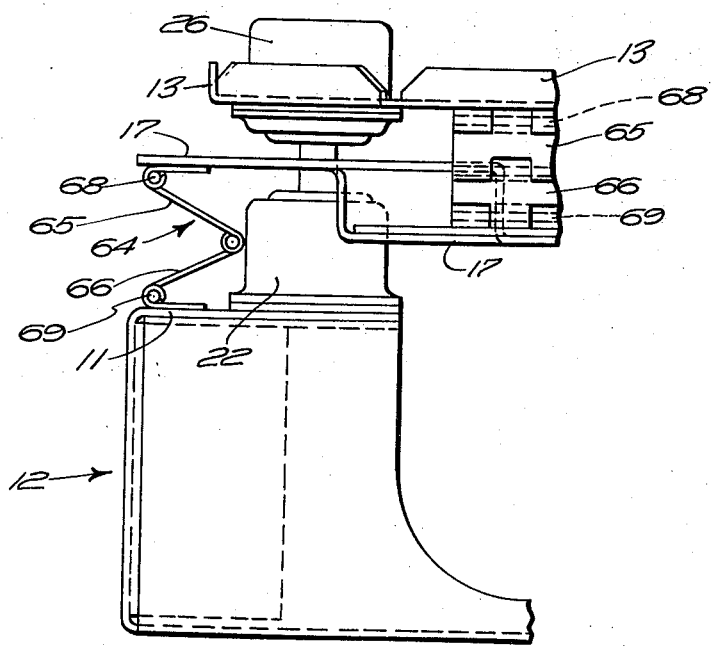
Fig. 6 is an elevation view similar to Fig. 2 showing the left hand portion of another embodiment of this invention.

In certain circumstances, it may be desirable to retain the functional characteristics of the constraining assemblies while maintaining a minimum stiffness in translation along the vertical and horizontal axes. When this circumstance exists, the embodiment illustrated in Fig. 6 may be substituted for that described previously. In this embodiment, the semi-cylindrical elements previously described are replaced by relatively long hinge assemblies 64. Each assembly is substituted for a semi-cylindrical element, and includes an upper hinge butt 65 and a lower hinge butt 66. In one pair the upper hinge butt 65 is pivoted to the intermediate structure 17 at the hinge pin 68, whereas the lower hinge butt 66 is pivoted to the supporting member 11 at the hinge pin 69. In the other pair the upper hinge butt 65 is pivoted to the supported member 13 at the hinge pin 68 and the lower hinge butt 66 is pivoted to the intermediate structure 17 at the hinge pin 69. These hinge pins extend respectively parallel with the edges of the upper and lower members, and have sufficient length to give the required rigidity to the constraining assembly.

Although several embodiments of the invention have been shown and described, it is to be understood that this disclosure is for the purpose of illustration only and that various changes and modifications may be made without departing from the spirit and scope of the invention as set forth in the appended claims.

We claim:

1. A vibration isolating assembly for supporting an object comprising spaced supporting and supported members, an intermediate structure interposed between said members in spaced relation thereto, resilient load carrying means extending between said members to support said supported member, a first constraining member located between and extending in a first direction along said supporting member and said structure, said first constraining member being secured to said supporting member and said structure along its length in said first direction, and a second constraining member located between and extending in a second direction, generally perpendicular to said first direction, along said supported member and said structure, said second constraining member being secured to said structure and said supported member along its length in said second direction, said first member being rigid along its length in said first direction and being flexible in said second direction and in a third direction generally perpendicular to both said first and second directions, said second member being rigid along its length in said second direction and being flexible in said first and third directions.

2. An assembly according to claim 1 wherein said resilient load carrying means comprises a resilient member interposed between said supporting member and said structure and a resilient member interposed between said supported member and said structure.

3. An assembly according to claim 1 having at least two of said first members spaced apart from each other and at least two of said second members spaced apart from each other.

4. An assembly according to claim 3, each of said first members comprising a semi-cylindrical element whose longitudinal axis extends in said first direction, each of said second members comprising a semi-cylindrical element whose longitudinal axis extends in said second direction.

5. An assembly according to claim 1, said first member comprising a semi-cylindrical element whose longitudinal axis extends in said first direction, said second member comprising a semi-cylindrical element whose longitudinal axis extends in said second direction.

6. An assembly according to claim 1, said first member comprising a hinge assembly having hinge butts pivotally joined together and to said structure and said supporting member, the pins of said hinge assembly extending in said first direction, said second member comprising a hinge assembly having hinge butts pivotally joined together and to said structure and said supported member, the pins of said last mentioned hinge assembly extending in said second direction.

References Cited in the file of this patent
UNITED STATES PATENTS

| | | |
|---|---|---|
| 1,554,161 | Hubbard | Sept. 15, 1925 |
| 2,216,814 | Gray | Oct. 8, 1940 |
| 2,441,509 | Robinson | May 11, 1948 |